(12) United States Patent
Martin

(10) Patent No.: US 12,740,546 B2
(45) Date of Patent: Sep. 22, 2026

(54) BREAKAWAY DEVICES FOR PET COLLARS AND OTHER DEVICES

(71) Applicant: Jason Martin, Kearns, UT (US)

(72) Inventor: Jason Martin, Kearns, UT (US)

( * ) Notice: Subject to any disclaimer, the term of this patent is extended or adjusted under 35 U.S.C. 154(b) by 0 days.

(21) Appl. No.: 19/352,897

(22) Filed: Oct. 8, 2025

(65) Prior Publication Data

US 2026/0130343 A1 May 14, 2026

Related U.S. Application Data

(60) Provisional application No. 63/719,619, filed on Nov. 12, 2024.

(51) Int. Cl.
*A01K 27/00* (2006.01)

(52) U.S. Cl.
CPC .................................. *A01K 27/005* (2013.01)

(58) Field of Classification Search
CPC .............................. A01K 27/005; A44B 11/00
See application file for complete search history.

(56) References Cited

U.S. PATENT DOCUMENTS 2,612,139 A * 9/1952 Collins ................ A01K 27/005 63/3
2,637,887 A * 5/1953 Goodman ............ A44C 5/2071 52/459
3,086,268 A 4/1963 Chaffin
3,589,341 A 6/1971 Krebs
3,994,265 A 11/1976 Banks
4,180,016 A 12/1979 George
4,231,137 A 11/1980 Fujimoto
4,455,719 A 6/1984 Morita
4,480,361 A 11/1984 Morita
4,502,265 A 3/1985 Horrigan
4,881,492 A 11/1989 Jones
4,917,049 A 4/1990 Peterson
5,050,538 A 9/1991 Gurski, Jr.
5,432,986 A 7/1995 Sexton
5,443,039 A * 8/1995 Suchowski ........ A44B 11/2592 24/625

(Continued)

FOREIGN PATENT DOCUMENTS

EP 4176713 A1 * 5/2023 ......... A44B 11/2592
GB 2382375 5/2003
GB 2604038 A * 8/2022 ........... A01K 27/001

*Primary Examiner* — Monica L Perry
*Assistant Examiner* — Aaron M Rodziwicz
(74) *Attorney, Agent, or Firm* — Faegre Drinker Biddle & Reath LLP

(57) ABSTRACT

A breakaway device includes a first strap portion, a second strap portion, and a breakaway coupling. The breakaway coupling includes first and second breakaway coupling portions. The first breakaway coupling portion is coupled to the first strap portion and includes a ramped recess. The second breakaway coupling portion is coupled to the second strap portion and is magnetically coupled to the first breakaway coupling portion. The second breakaway coupling portion includes a ramped protrusion received in the ramped recess. The breakaway device further includes a breakaway override that selectively inhibits detachment of the first breakaway coupling portion and the second breakaway coupling portion from each other.

20 Claims, 9 Drawing Sheets

(56) References Cited

U.S. PATENT DOCUMENTS 5,450,820 A * 9/1995 Kirsch ................. A01K 27/005 119/865
5,647,101 A * 7/1997 Morita .................... A41F 1/002 24/303
5,791,297 A 8/1998 Mudge
5,988,927 A 11/1999 Pfarr
6,125,793 A 10/2000 Petty
6,247,427 B1 * 6/2001 DeBien ................ A01K 27/005 119/776
6,360,404 B1 * 3/2002 Mudge ................. A01K 27/005 24/115 F
6,457,896 B1 * 10/2002 deDoes .................. A01K 69/00 403/164
6,499,437 B1 12/2002 Sorensen
7,117,659 B1 10/2006 Grogoza
8,726,850 B2 5/2014 Rosenquist
9,101,185 B1 * 8/2015 Greenberg ......... A45C 13/1069
9,179,647 B2 11/2015 Lambert
9,314,001 B2 4/2016 Siwak
10,149,989 B2 * 12/2018 Leslie .................... A41B 9/007
11,470,923 B1 10/2022 Nikolla
11,638,415 B2 * 5/2023 Bartow ................ A01K 27/005 119/863
12,201,086 B2 * 1/2025 Chow ................ A44B 11/2592
2001/0037774 A1 * 11/2001 De Bien .............. A01K 27/005 119/776
2003/0005558 A1 1/2003 Wong
2005/0145203 A1 7/2005 Wang
2008/0060172 A1 * 3/2008 Moss ....................... A44C 5/20 24/373
2011/0289737 A1 12/2011 Ninomiya
2013/0185901 A1 7/2013 Heyman
2013/0269629 A1 10/2013 Holt, Jr.
2013/0333634 A1 * 12/2013 Rosenquist .......... A01K 27/001 24/586.11
2021/0274754 A1 * 9/2021 Talley .................. A01K 11/008
2021/0282374 A1 * 9/2021 Yeager ................. A01K 27/005
2023/0145756 A1 * 5/2023 Chow .................. A01K 27/005 119/865
2025/0318498 A1 * 10/2025 Grossaint ................. A01K 1/04

* cited by examiner

BREAKAWAY DEVICES FOR PET COLLARS AND OTHER DEVICES

CROSS-REFERENCE TO RELATED APPLICATION

This application claims the benefit of U.S. Provisional Application No. 63/719,619, filed Nov. 12, 2024, which is incorporated herein by reference in its entirety for all purposes.

FIELD OF THE DISCLOSURE

The present disclosure relates generally to safety breakaway devices, and more specifically to breakaway devices to prevent injuries to an animal by detaching under certain conditions.

BACKGROUND OF THE DISCLOSURE

Collars are commonly utilized by pet owners for a variety of purposes, including attaching a leash and identification through displaying tags. Despite their widespread use and functionality, conventional collars present inherent safety risks. One significant concern is the potential for entrapment or injury. This can occur when the collar becomes ensnared or twisted on external objects, or during aggressive play. The risk is exacerbated by the tendency of pets to actively explore environments unsupervised where there are protruding objects and other obstacles. Rough play can increase the likelihood of collars getting twisted, further raising safety concerns.

It is with respect to these and other general considerations that the aspects disclosed herein have been made. Also, although relatively specific problems may be discussed, it should be understood that the examples should not be limited to solving the specific problems identified in the background elsewhere in this disclosure.

SUMMARY OF THE DISCLOSURE

In one example ("Example 1"), a breakaway device comprises: a first strap portion; a second strap portion; a breakaway coupling comprising: a first breakaway coupling portion coupled to the first strap portion, the first breakaway coupling portion comprising a ramped recess; a second breakaway coupling portion coupled to the second strap portion and magnetically coupled to the first breakaway coupling portion, the second breakaway coupling portion comprising a ramped protrusion received in the ramped recess; a breakaway override coupling coupled to the breakaway coupling, the breakaway override coupling comprising: a first override coupling portion coupled to the first breakaway coupling portion; and a second override coupling portion coupled to the second breakaway coupling portion; wherein the first breakaway coupling portion and the second breakaway coupling portion are configured to detach from each other upon application of a force component in a transverse plane exceeding a threshold, and wherein, when the first breakaway coupling portion and the second breakaway coupling portion are coupled to each other, the first override coupling portion and the second override coupling portion are configured to be selectively coupled to inhibit detachment of the first breakaway coupling portion and the second breakaway coupling portion from each other.

In another example ("Example 2"), the breakaway device of Example 1, wherein the first breakaway coupling portion is attracted to the second breakaway coupling portion along an axis of magnetic attraction, and the transverse plane is substantially perpendicular to the axis of magnetic attraction.

In one example ("Example 3"), a breakaway device includes: a first strap portion; a second strap portion; a breakaway coupling comprising: a first breakaway coupling portion coupled to the first strap portion, the first breakaway coupling portion comprising a ramped recess; a second breakaway coupling portion coupled to the second strap portion and magnetically coupled to the first breakaway coupling portion, the second breakaway coupling portion comprising a frustoconical protrusion received in the ramped recess, the frustoconical protrusion having a protrusion base, an apex surface, and a longitudinal axis extending between the protrusion base and the apex surface, and the apex surface being substantially flat across a diameter thereof; wherein the first breakaway coupling portion and the second breakaway coupling portion are configured to detach from each other upon application of a force component in a transverse plane exceeding a threshold, the transverse plane being substantially perpendicular to the longitudinal axis.

In another example ("Example 4"), the breakaway device of Example 3, wherein the breakaway coupling lacks any square protrusions coupling the first breakaway coupling portion and the second breakaway coupling portion.

In one example ("Example 5"), the breakaway device of Example 3, further comprising a breakaway override coupling configured to inhibit detachment of the first breakaway coupling portion and the second breakaway coupling portion from each other.

In another example ("Example 6"), the breakaway device of Example 5, wherein the breakaway override coupling comprises: a first override coupling portion coupled to the first breakaway coupling portion; and a second override coupling portion coupled to the second strap portion, the second override coupling portion configured to detachably couple to the first override coupling portion to inhibit detachment of the first breakaway coupling portion and the second breakaway coupling portion from each other.

In one example ("Example 7"), the breakaway device of Example 6, wherein the first override coupling portion comprises a first ring and the second override coupling portion comprises a second ring.

In another example ("Example 8"), the breakaway device of Example 6, wherein the first override coupling portion and the second override coupling portion are pivotable relative to the breakaway coupling.

In one example ("Example 9"), the breakaway device of Example 6, wherein the first and second override coupling portions each comprise a metal.

In another example ("Example 10"), the breakaway device of Example 6, wherein the second override coupling portion is slidable along the second strap portion.

In one example ("Example 11"), the breakaway device of Example 10, wherein the override coupling further comprises: a slot integrated into the second strap portion, the slot extending along a length of the second strap portion and configured guide the movement of the second override coupling portion; and the second override coupling portion configured to be magnetically secured in a retracted position within the second strap portion.

In another example ("Example 12"), the breakaway device of Example 11, wherein the slot is reinforced with a durable material to inhibit wear from repeated sliding of the second override coupling portion.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

DESCRIPTION OF THE DRAWINGS

Non-limiting and non-exhaustive examples are described with reference to the following figures.

Figure 1:
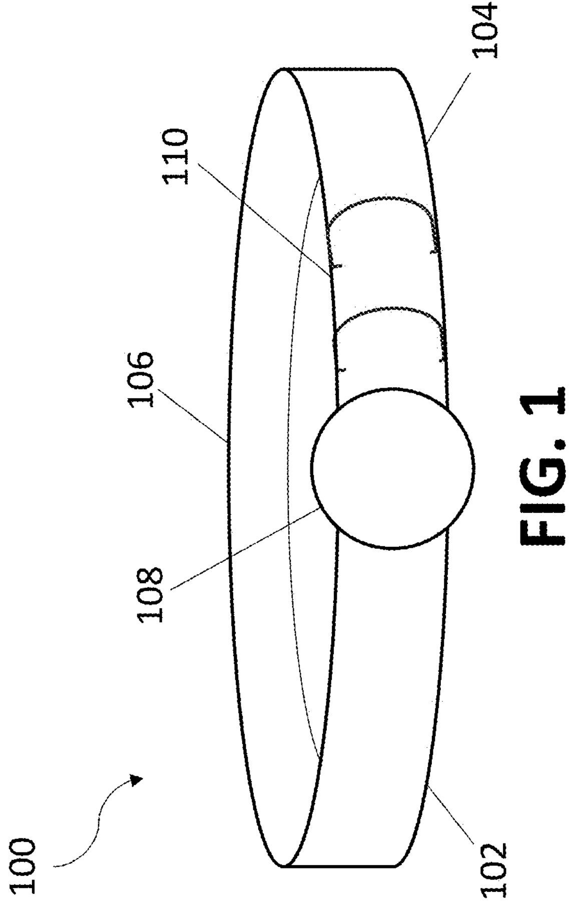
FIG. 1 is a perspective view of a breakaway device including a breakaway coupling, according to a first embodiment of the present disclosure.

It should be understood that the drawings are intended facilitate understanding of exemplary embodiments of the present invention are not necessarily to scale.

DETAILED DESCRIPTION OF THE DISCLOSURE

The following description refers to the accompanying drawings which illustrate various aspects. Although specific aspects are shown and described, it is to be understood that additional and/or alternative features may be employed in other aspects. The following detailed description is not to be taken in a limiting sense, and the scope of the methods and apparatuses are defined by the appended claims and their equivalents.

It should be understood that like reference numerals are intended to identify the same structural components, elements, portions, or surfaces consistently throughout the several drawing figures, as such components, elements, portions, or surfaces may be further described or explained by the entire written specification, of which this detailed description is an integral part. Unless otherwise indicated, the drawings are intended to be read (for example, cross-hatching, arrangement of parts, proportion, degree, etc.) together with the specification, and are to be considered a portion of the written description.

The above described safety concerns underscore the need for improved collar designs that incorporate breakaway coupling technology to inhibit harm to the pet. In one aspect, the present disclosure relates to a breakaway device that ensures that when a threshold of force is exceeded, the collar detaches to inhibit injury, while maintaining secure attachment during normal activities. The incorporation of the breakaway coupling into collars represents a significant advancement in pet safety. Additionally, the inclusion of the breakaway override coupling is useful in situations where maintaining a secure attachment is important, such as during training, in high traffic areas, or in environments where the risk of accidental detachment could pose additional hazards. The breakaway override coupling thus provides pet owners with flexibility to choose between automatic safety detachment and secure attachment, enhancing both the safety and practicality of the collar.

In a related aspect, the present disclosure relates to a breakaway device designed to enhance safety and reliability in various applications, such as pet collars, harnesses, and wearable devices. Although the invention is described with respect to pets, it is contemplated that the breakaway device may be used within any device that would benefit from the breakaway function provided by such a coupling.

FIG. 1 illustrates a perspective view of a breakaway device 100, according to a first embodiment of the present disclosure. The device 100 includes a first strap portion 102, and a second strap portion 104, and a breakaway coupling 108 that selectively couples the strap portions 102, 104. Illustratively, the first and second strap portions 102, 104 form a strap 106, thereby forming the device 100 as a pet collar. the first and second strap portions 102, 104 may be coupled by a buckle (not shown) that facilitates adjusting the size of the strap 106. The strap 106 can be made from various materials, including woven textiles or fabrics. The device 100 further includes a breakaway override coupling 110.

Figure 2:
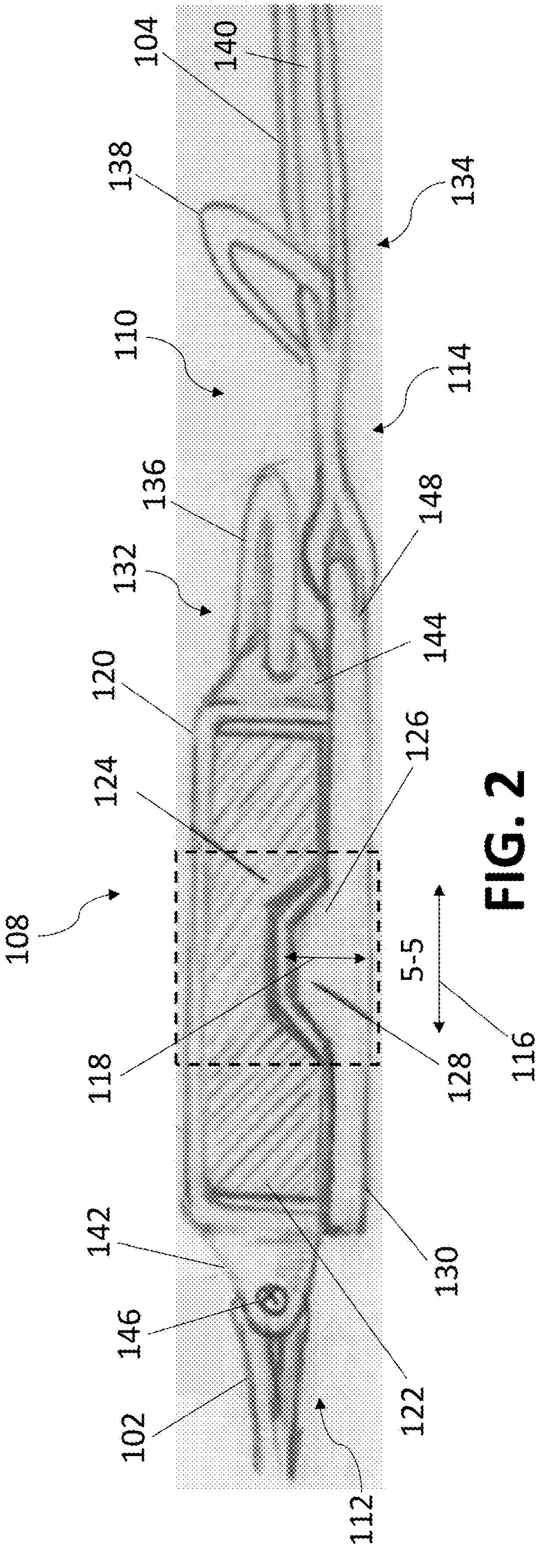
FIG. 2 is a side section view of the breakaway device of FIG. 1 in a magnetically coupled position.

FIG. 2 is a side section view of the breakaway device 100, showing the breakaway coupling 108 in a coupled configuration. The breakaway coupling 108 includes a first breakaway coupling portion 112 and a second breakaway coupling portion 114. The first and second breakaway coupling portions 112, 114 are aligned and magnetically coupled to form a secure attachment in the coupled configuration. The first and second breakaway coupling portions 112, 114 are designed to detach from each other upon application of a force component in a transverse plane 116 exceeding a threshold, the transverse plane 116 being substantially perpendicular to the longitudinal axis 118. The first and second breakaway coupling portions 112, 114 also detach from each other upon application of a pulling force parallel to the longitudinal axis 118 and a twisting force around the longitudinal axis 118 exceeding threshold. The axis of magnetic attraction is parallel to the longitudinal axis 118, ensuring a secure magnetic coupling between the first and second breakaway coupling portions 112, 114. This detachment advantageously facilitates pet safety by inhibiting entrapment.

The breakaway coupling 108 includes the first breakaway coupling portion 112, which includes a magnet housing 120 and a magnet 122 with a ramped recess 124. The second breakaway coupling portion 114 includes a protrusion base 126 and a ramped or frustoconical protrusion 128. The ramped or frustoconical protrusion 128 and the ramped recess 124 are configured to inhibit relative sliding of the first and second breakaway coupling portions 112, 114 but detach upon the application of a transverse force exceeding a threshold, ensuring pet safety. Additional details are provided below.

The magnet housing 120, which contains the magnet 122 in the first breakaway coupling portion 112 is constructed of ferrous steel. Such a material structurally reinforces the magnet 122 and focuses the magnetic field of the magnet 122. The magnet 122 can be made from neodymium or samarium-cobalt, providing reliable magnetic attraction between the first and second breakaway coupling portions 112, 114, but allowing for detachment upon application of a force component in the transverse plane 116 exceeding the threshold. The base 130 of the second breakaway coupling portion 114 could be made of ferromagnetic materials, such as iron or certain grades of steel, ensuring a strong magnetic attraction with the magnet 122 housed in the first breakaway coupling portion 112. Alternatively, the base 130 may include a magnet itself.

The breakaway override coupling 110 is formed by a first override coupling portion 132 and a second override coupling portion 134. Illustratively, the first override coupling portion 132 includes a first ring 136, and the second override coupling portion 134 includes a second ring 138. The first and second rings 136, 138 are configured to be secured together (for example, via a clasp at the end of a leash) to inhibit detachment of the first and second breakaway coupling portions 112, 114. In other words, when the first and second breakaway coupling portions 112, 114 are coupled to form the breakaway coupling 108, the breakaway override coupling 110 can be selectively engaged by interlocking the first ring 136 and the second ring 138 with each other to prevent detachment of the first and second breakaway coupling portions 112, 114. When the first and second rings 136, 138 are engaged, they inhibit separation of the first and second portions 112, 114 of the breakaway coupling 108 even if a force exceeding the threshold is applied in the transverse plane 116. This feature is valuable for situations in which a leash is used, specifically by coupling the leash to both the first and second rings 136, 138, and use of the breakaway function of the device 100 is undesirable. The ability to selectively engage or disengage the breakaway override coupling 110 ensures that the collar can adapt to various scenarios, enhancing the safety and usability of the device 100. This feature adds a layer of safety by preventing accidental detachment, which could lead to a pet escaping or getting lost in potentially dangerous situations. Additionally, the first and second rings 136, 138 are made from durable materials such as metal, ensuring longevity and reliability of this enhanced safety feature.

The second override coupling portion 134 is configured so that it is slidable along the second strap portion 104. More specifically, a slot 140 integrated into the second strap portion 104 facilitates movement of the second override coupling portion 134 along the second strap portion 104. The slot 140 extends along a length of the second strap portion 104 and is reinforced with a durable material to inhibit wear from repeated sliding. The second override coupling portion 134 is configured to be magnetically secured in a retracted position along or within the second strap portion 104 inhibiting the breakaway override coupling 110 from being engaged unintentionally. In other words, by allowing the second ring 138 to slide along the second strap portion 104, the second ring 138 can be held in a retracted position when not in use. This prevents accidental engagement of the breakaway override coupling 110. The ability to secure the breakaway override coupling 110 in a retracted position allows the collar to detach properly in emergency situations, preventing injury or entrapment.

Figure 3:
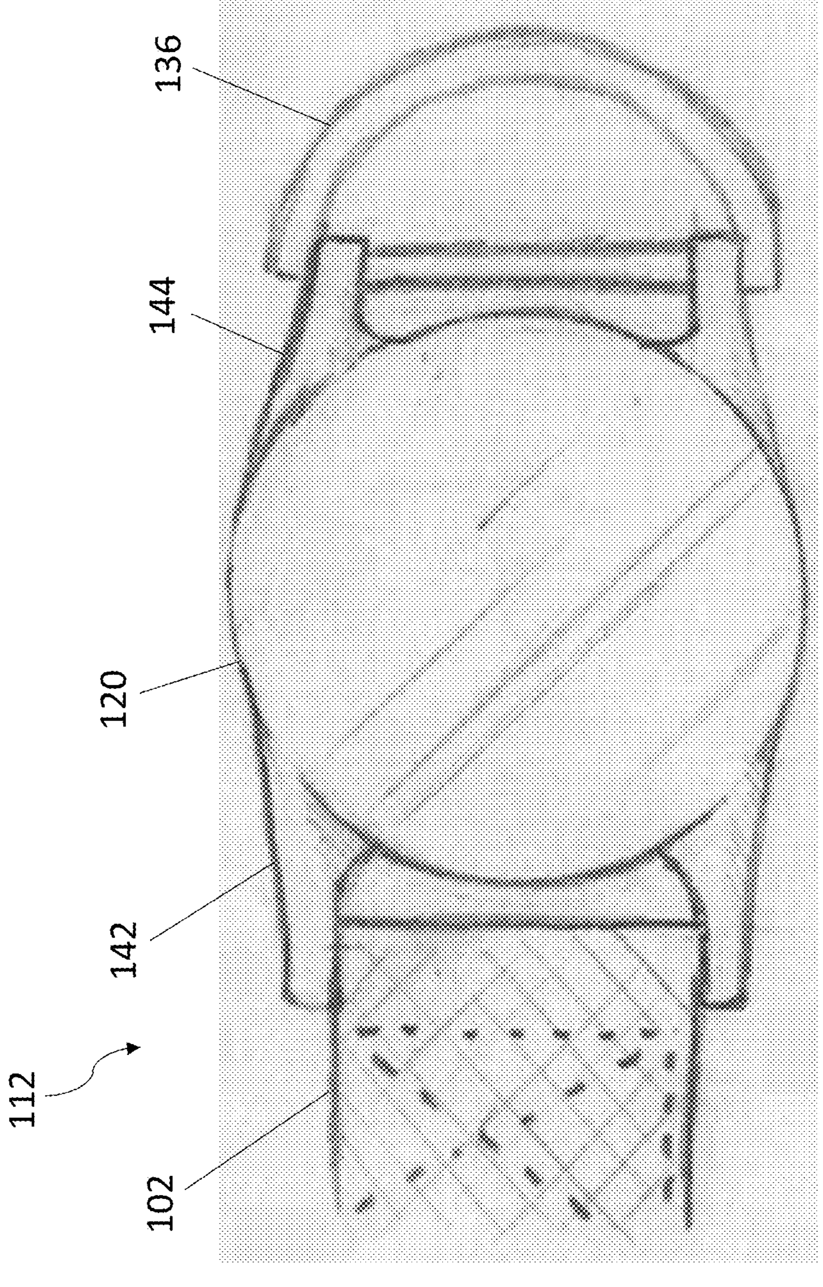
FIG. 3 is a top view of a first breakaway coupling portion of the breakaway coupling of FIG. 2.

FIG. 3 is a top view of the first breakaway coupling portion 112 wherein the first strap portion 102 is connected to the magnet housing 120. Illustratively, the magnet housing 120 is generally circular and is configured to securely house the magnet 122. The magnet housing 120 includes a first set of arms 142 and a second set of arms 144. The first set of arms 142 couple to a pin 146 (FIG. 2). The pin 146 acts as an anchor point for the first strap portion 102. More specifically, the pin 146 allows the first strap portion 102 to be sewn securely onto itself. The second set of arms 144 couple to the first ring 136.

Figure 4:
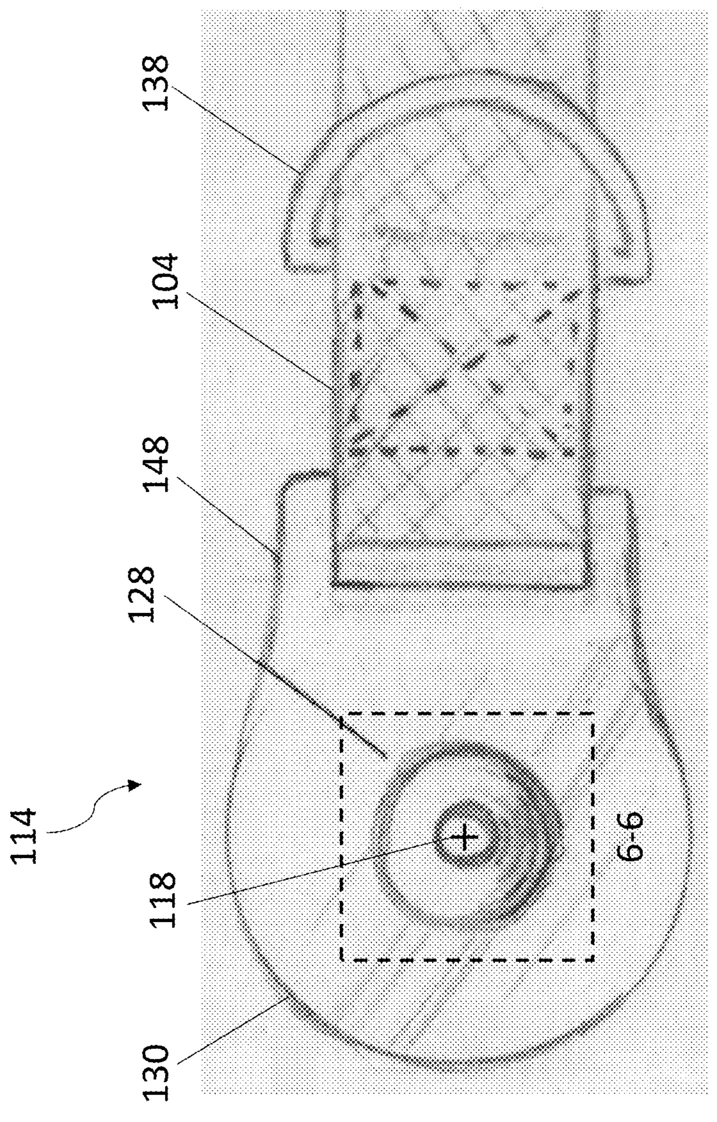
FIG. 4 is a top view of a second breakaway coupling portion of the breakaway coupling of FIG. 2, illustrating a protrusion of the second breakaway coupling portion.

FIG. 4 is a top view of the second breakaway coupling portion 114 wherein the second strap portion 104 is coupled to the base 130. The ramped or frustoconical protrusion 128 protrudes from the base 130. The base 130 includes a third set of arms 148. The third set of arms 148 couple to a pin (not shown) that acts as an anchor point for the second strap portion 104, thereby coupling the second strap portion 104 to the base 130. The pin (not shown), which can be monolithic with the base or a separate component, allows the second strap portion 104 to be sewn securely onto itself.

Figure 5:
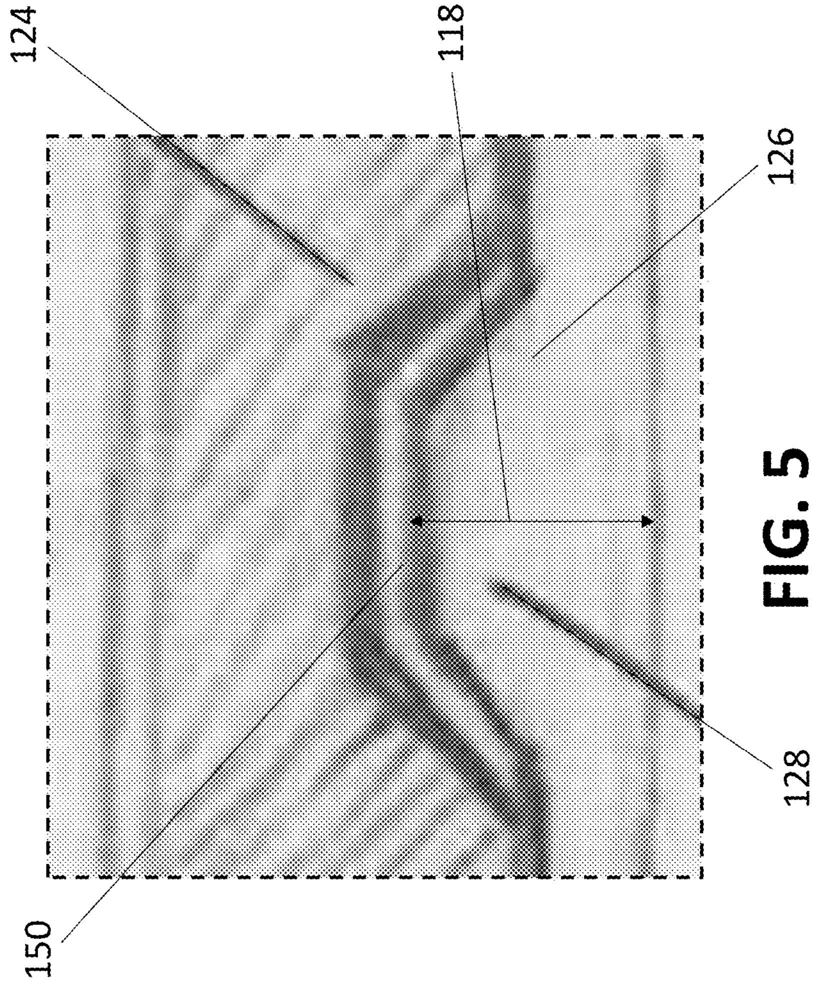
FIG. 5 is a detailed view of the area within line 5-5 of FIG. 2, providing a side section view of the protrusion and a recess of the breakaway coupling.
Figure 6:
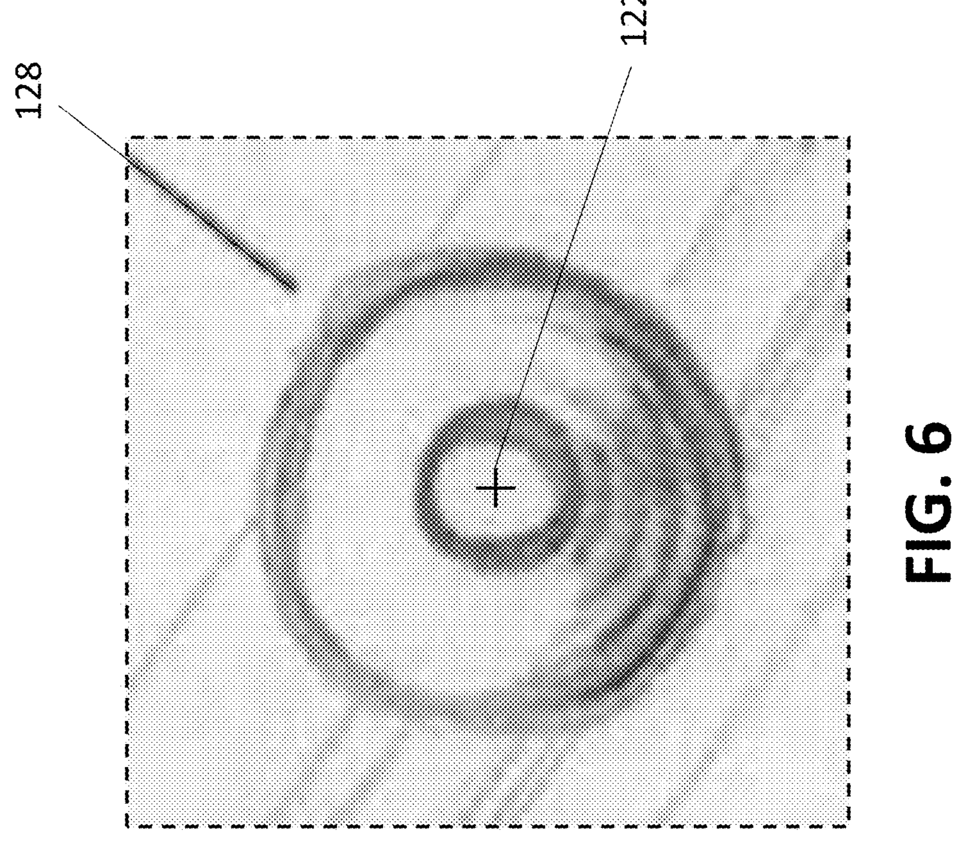
FIG. 6 is a detailed view of the area within line 6-6 of FIG. 4, providing a top view of the protrusion of the breakaway coupling.

FIGS. 5 and 6 are detailed views of the breakaway coupling 108 detailing the shape of the ramped or frustoconical protrusion 128 and ramped recess 124. The ramped or frustoconical protrusion 128 includes a protrusion base 126, an apex surface 150, and a longitudinal axis 118 extending between the protrusion base 126 and the apex surface 150. The protrusion base 126 is the wider end of the ramped or frustoconical protrusion 128 and is monolithically coupled to the base 130. The apex surface 150 is the narrower end of the ramped or frustoconical protrusion 128, and illustratively is substantially flat across its diameter. Illustratively, and referring specifically to FIG. 6, the ramped or frustoconical protrusion 128 is axisymmetric, or symmetric about the longitudinal axis 118. The first breakaway coupling portion 112 includes the ramped recess 124, which is configured to receive the ramped or frustoconical protrusion 128. The ramped or frustoconical protrusion 128 facilitates easy alignment into the ramped recess 124 while allowing for a secure hold. In other words, the complementary shapes of the ramped or frustoconical protrusion 128 and the ramped recess 124 ensures that the coupling can disengage smoothly and reliably under certain conditions, enhancing the safety and functionality of the breakaway device 100. Furthermore, the breakaway coupling 108 lacks any square protrusions, facilitating smooth detachment.

Figure 7:
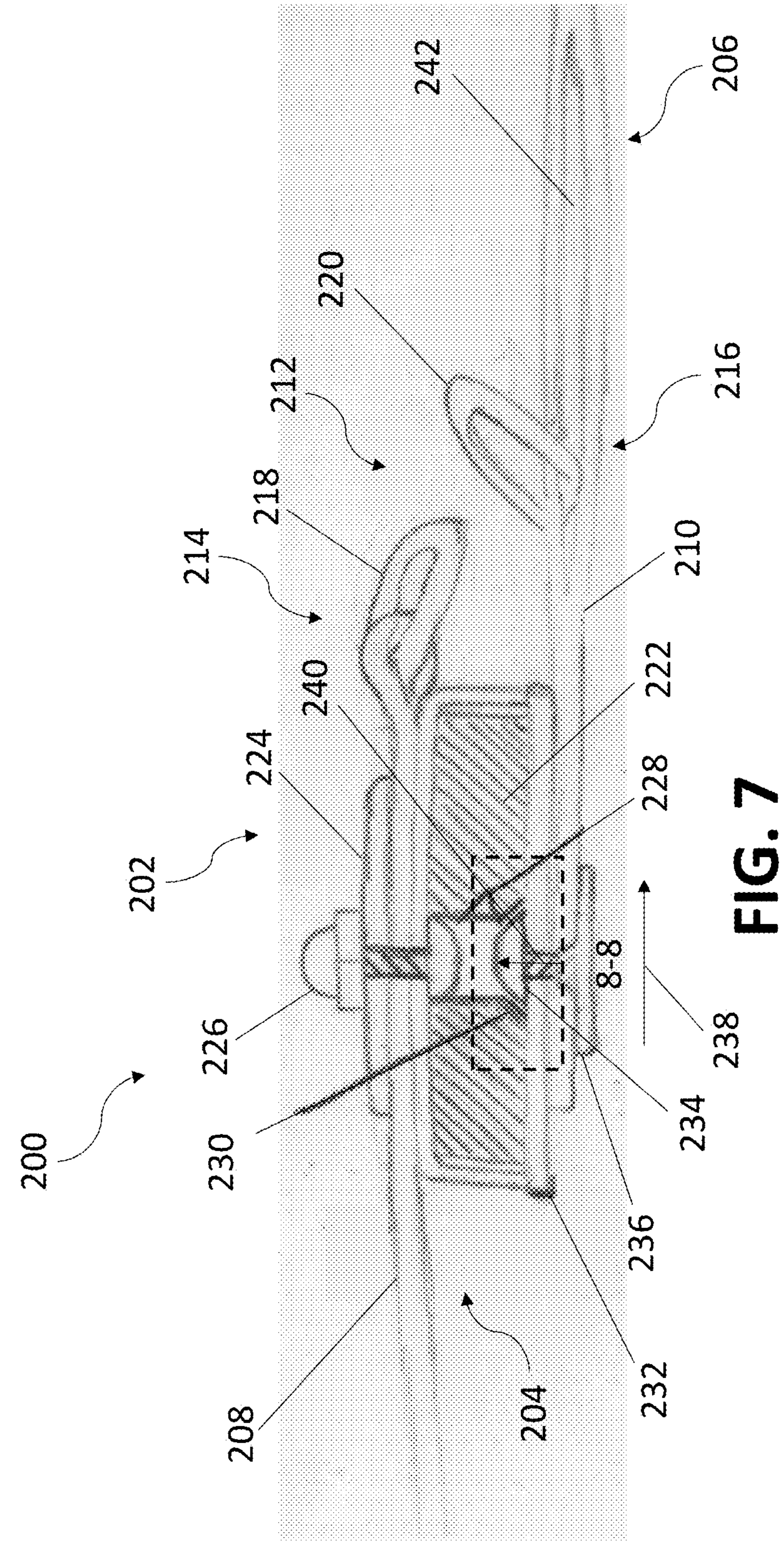
FIG. 7 is a side section view of a breakaway device including a breakaway coupling, according to a second embodiment of the present disclosure.

FIG. 7 is a side section view of a breakaway device 200, according to a second embodiment of the present disclosure. The breakaway device 200 is similar to the breakaway device 100 as it includes a breakaway coupling 202 with a first breakaway coupling portion 204 and a second breakaway coupling portion 206. The first breakaway coupling portion 204 is coupled to a first strap portion 208 and the second breakaway coupling portion 206 is coupled to a second strap portion 210. The device 200 further includes a breakaway override coupling 212 with a first override coupling portion 214 and a second override coupling portion 216. The first override coupling portion 214 includes a first ring 218 and the second breakaway coupling portion includes a second ring 220. The first and second rings 218, 220 are configured to be secured together to inhibit detachment of the first and second override coupling portions 214, 216. Additionally, the second ring 220 can be held in a retracted position when not in use to inhibit accidental engagement of the breakaway override coupling 212.

In contrast to the device 100, the first breakaway coupling portion 204 includes a pot cup magnet 222, a first washer 224, an acorn nut 226, and a bolt 228. The first washer 224 is positioned beneath the acorn nut 226 and above the first strap portion 208. The bolt 228 is positioned in the pot cup magnet 222 underneath the first strap portion 208 and passes through the first strap portion 208 and is secured by the acorn nut 226. This configuration ensures a secure attachment of the first strap portion 208 to the pot cup magnet 222. The pot cup magnet 222 is configured with a ramped recess 230.

The second breakaway coupling portion 206 includes a second washer 232, a ramped or frustoconical protrusion 234, and a weld nut 236. The second washer 232 is coupled to the second strap portion 210 by the weld nut 236 on the bottom of the second strap portion 210. The ramped or frustoconical protrusion 234 is anchored to the weld nut 236 by passing through the second strap portion 210 and the second washer 232. The ramped or frustoconical protrusion 234 and the ramped recess 230 are configured to magnetically couple and detach upon the application of a transverse force exceeding a threshold, ensuring pet safety.

The first and second breakaway coupling portions 204, 206 are designed to detach from each other upon application of a force component in a transverse plane 238 exceeding a threshold, the transverse plane 238 being substantially perpendicular to the longitudinal axis 240. The axis of magnetic attraction is parallel to the longitudinal axis 240, ensuring a secure magnetic coupling between the first and second breakaway coupling portions 204, 206. This detachment advantageously facilitates pet safety by inhibiting entrapment.

Figure 8:
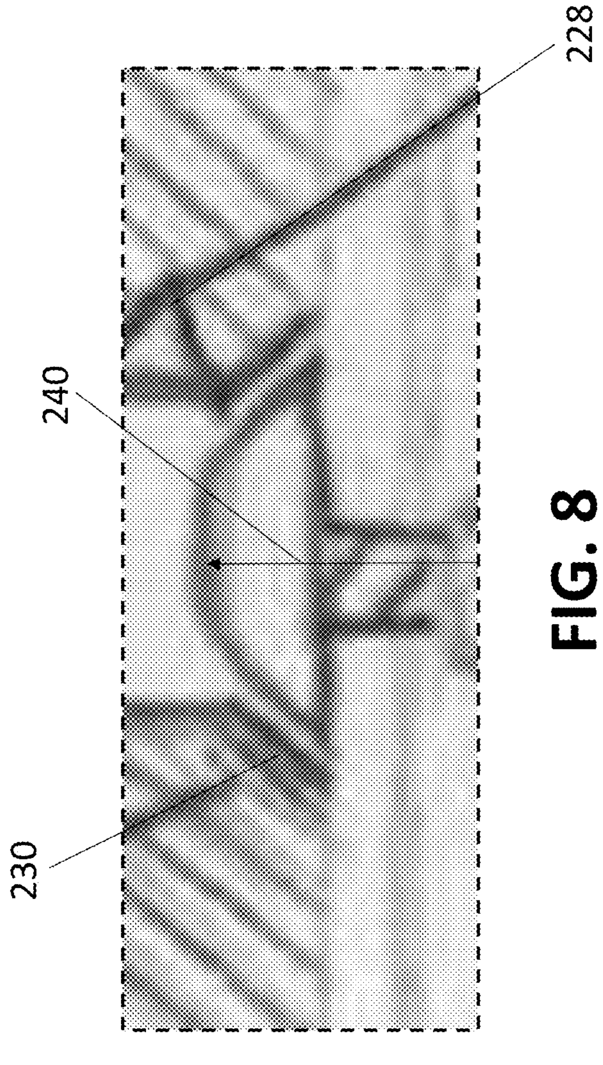
FIG. 8 is a detailed view of the area within line 8-8 of FIG. 7, providing a side section view of a protrusion and a recess of the breakaway coupling.

FIG. 8. is a detailed side section view of the breakaway coupling 202 of breakaway device 200 detailing the shape of the ramped or frustoconical protrusion 234 and the ramped recess 230 which is similar to the corresponding features of the device 100. The second breakaway coupling portion 206 includes the ramped or frustoconical protrusion 234 and the first breakaway coupling portion 204 includes the ramped recess 230 configured to receive the ramped or frustoconical protrusion 234. In this embodiment, the ramped recess 230 is formed by the pot cup magnet 222. The ramped or frustoconical protrusion 234 is held in place by the weld nut 236, allowing the ramped or frustoconical protrusion 234 to securely fit into the ramped recess 230. The complementary shapes of the ramped or frustoconical protrusion 234 and the ramped recess 230 ensures that the coupling can disengage smoothly and reliably under the specified conditions, enhancing the safety and functionality of the breakaway device 200. Furthermore, the breakaway coupling 202 lacks any square protrusions, enhancing smooth detachment.

Figure 9:
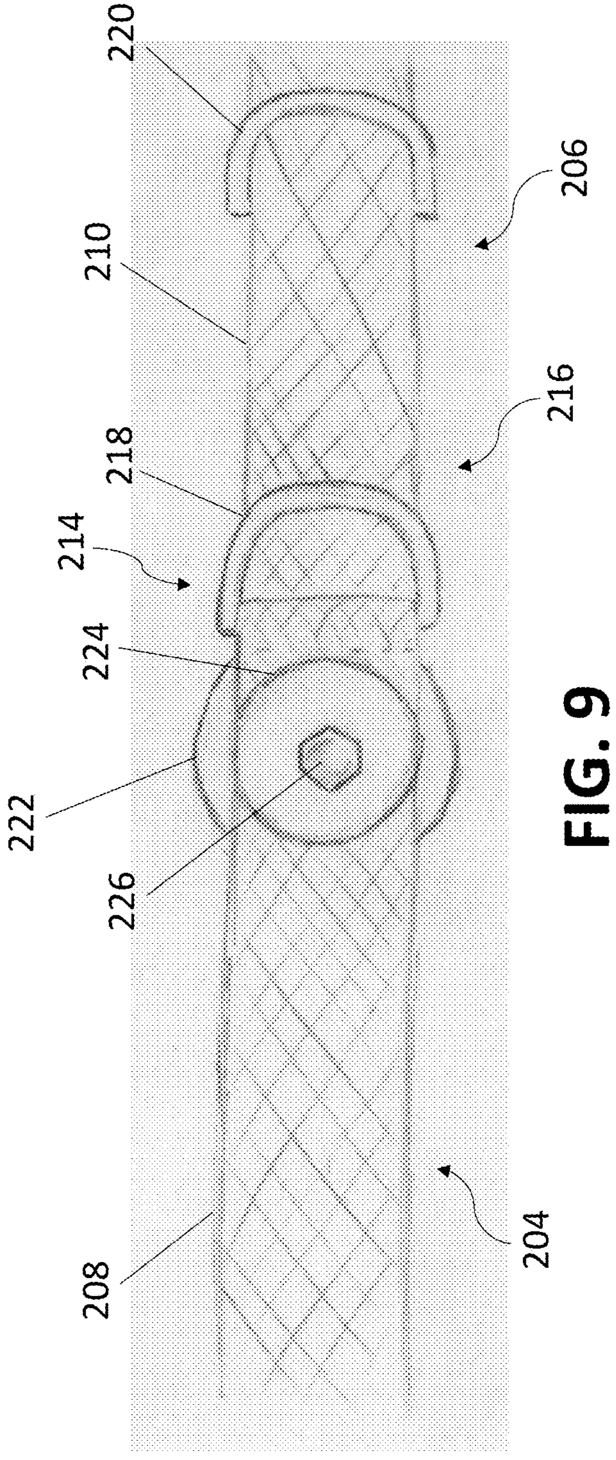
FIG. 9 is a top view of the breakaway device of FIG. 7 illustrating a first breakaway coupling portion of the breakaway coupling.

FIG. 9 is a top view of the breakaway device 200. The first breakaway coupling portion 204 includes the pot cup magnet 222 coupled the first strap portion 208 via the first washer 224 and the acorn nut 226. The acorn nut 226 secures the assembly of the first washer 224, the first strap portion 208, and the pot cup magnet 222 to the bolt 228 shown in FIG. 7, ensuring the components are held firmly together. The first strap portion 208 loops through the first ring 218 and is fastened securely onto itself, ensuring a strong attachment. The second ring 220 is configured to slide within the slot 242 of the second strap portion 210.

Various other modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

What is claimed is:

1. A breakaway device comprising:

a first strap portion;

a second strap portion;

a breakaway coupling comprising:

a first breakaway coupling portion coupled to the first strap portion, the first breakaway coupling portion comprising a ramped recess;

a second breakaway coupling portion coupled to the second strap portion and magnetically coupled to the first breakaway coupling portion, the second breakaway coupling portion comprising a ramped protrusion received in the ramped recess;

a breakaway override coupling coupled to the breakaway coupling, the breakaway override coupling comprising:

a first override coupling portion coupled to the first breakaway coupling portion; and a second override coupling portion coupled to the second breakaway coupling portion;

wherein the first breakaway coupling portion and the second breakaway coupling portion are configured to detach from each other upon application of a force component in a transverse plane exceeding a threshold, and wherein, when the first breakaway coupling portion and the second breakaway coupling portion are coupled to each other, the first override coupling portion and the second override coupling portion are configured to be selectively coupled to inhibit detachment of the first breakaway coupling portion and the second breakaway coupling portion from each other.

2. The breakaway device of claim 1, wherein the first breakaway coupling portion is attracted to the second breakaway coupling portion along an axis of magnetic attraction, and the transverse plane is substantially perpendicular to the axis of magnetic attraction.

3. The breakaway device of claim 1, wherein the breakaway coupling lacks any square protrusions coupling the first breakaway coupling portion and the second breakaway coupling portion.

4. The breakaway device of claim 1, wherein the first override coupling portion comprises a first ring and the second override coupling portion comprises a second ring.

5. The breakaway device of claim 1, wherein the first override coupling portion and the second override coupling portion are pivotable relative to the breakaway coupling.

6. The breakaway device of claim 1, wherein the first override coupling portion and the second override coupling portion each comprise a metal.

7. The breakaway device of claim 1, wherein the second override coupling portion is slidable along the second strap portion.

8. The breakaway device of claim 1, wherein the breakaway override coupling further comprises:

a slot integrated into the second strap portion, the slot extending along a length of the second strap portion and configured guide the movement of the second override coupling portion; and the second override coupling portion configured to be magnetically secured in a retracted position within the second strap portion.

9. The breakaway device of claim 8, wherein the slot is reinforced with a durable material to inhibit wear from repeated sliding of the second override coupling portion.

10. The breakaway device of claim 1, wherein the first breakaway coupling portion comprises a magnet including the ramped recess.

11. A breakaway device comprising:

a first strap portion;

a second strap portion;

a breakaway coupling comprising:

a first breakaway coupling portion coupled to the first strap portion, the first breakaway coupling portion comprising a ramped recess;

a second breakaway coupling portion coupled to the second strap portion and magnetically coupled to the first breakaway coupling portion, the second breakaway coupling portion comprising a frustoconical protrusion received in the ramped recess, the frustoconical protrusion having a protrusion base, an apex surface, and a longitudinal axis extending between the protrusion base and the apex surface, and the apex surface being substantially flat across a diameter thereof;

wherein the first breakaway coupling portion and the second breakaway coupling portion are configured to detach from each other upon application of a force component in a transverse plane exceeding a threshold, the transverse plane being substantially perpendicular to the longitudinal axis.

12. The breakaway device of claim 11, wherein the breakaway coupling lacks any square protrusions coupling the first breakaway coupling portion and the second breakaway coupling portion.

13. The breakaway device of claim 11, further comprising a breakaway override coupling configured to inhibit detachment of the first breakaway coupling portion and the second breakaway coupling portion from each other.

14. The breakaway device of claim 13, wherein the breakaway override coupling comprises:

a first override coupling portion coupled to the first breakaway coupling portion; and a second override coupling portion coupled to the second strap portion, the second override coupling portion configured to detachably couple to the first override coupling portion to inhibit detachment of the first breakaway coupling portion and the second breakaway coupling portion from each other.

15. The breakaway device of claim 14, wherein the first override coupling portion comprises a first ring and the second override coupling portion comprises a second ring.

16. The breakaway device of claim 14, wherein the first override coupling portion and the second override coupling portion are pivotable relative to the breakaway coupling.

17. The breakaway device of claim 14, wherein the first and second override coupling portions each comprise a metal.

18. The breakaway device of claim 14, wherein the second override coupling portion is slidable along the second strap portion.

19. The breakaway device of claim 18, wherein the override coupling further comprises:

a slot integrated into the second strap portion, the slot extending along a length of the second strap portion and configured guide the movement of the second override coupling portion; and the second override coupling portion configured to be magnetically secured in a retracted position within the second strap portion.

20. The breakaway device of claim 19, wherein the first breakaway coupling portion comprises a magnet including the ramped recess.

* * * * *